A. F. W. PARTZ.
Improvement in Manufacture of Sugar in Blocks or Cubes.
No. 132,921. Patented Nov. 12, 1872.
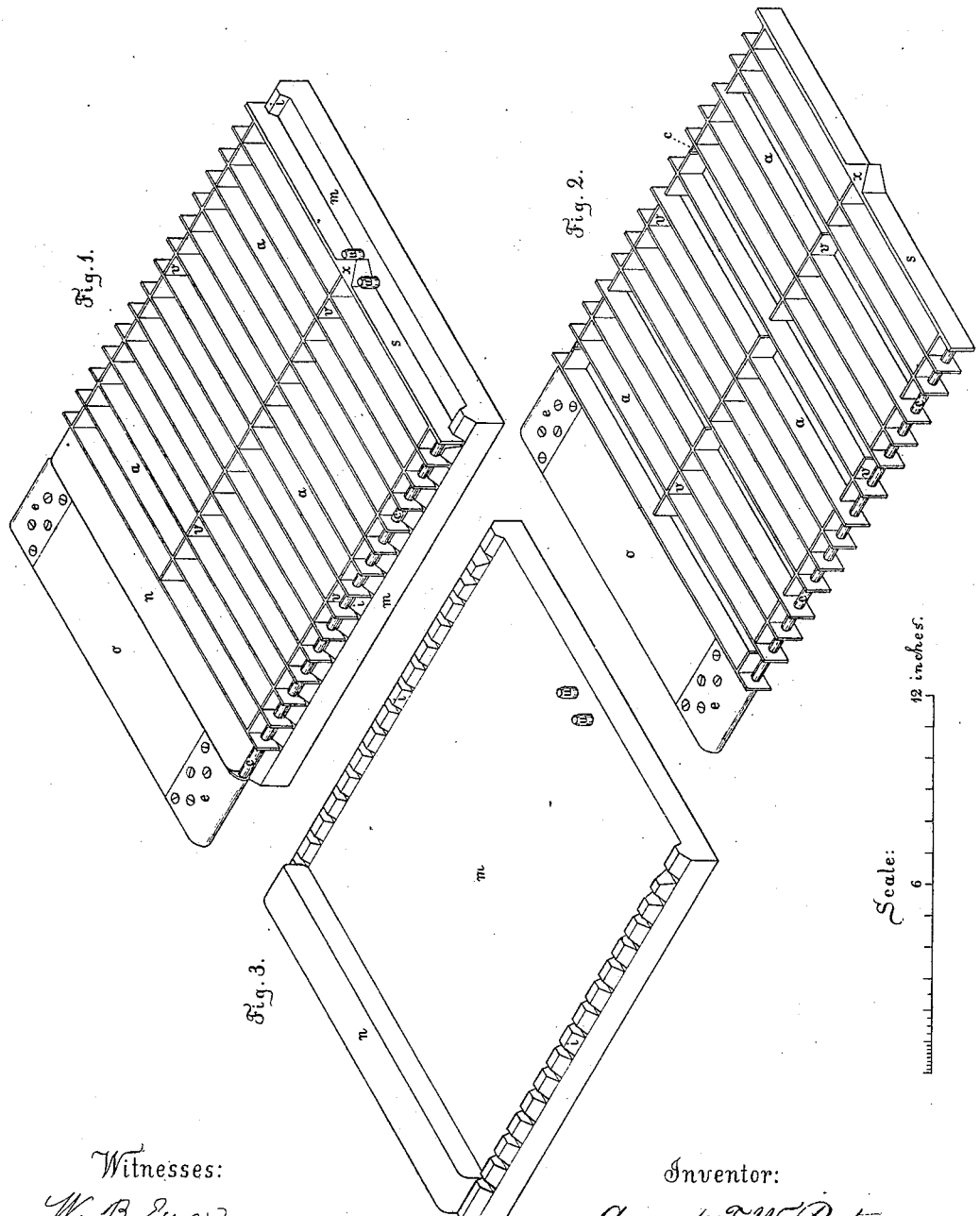
Witnesses:
W. B. Ewer
C. M. Richardson
Inventor:
August F. W. Partz

UNITED STATES PATENT OFFICE.

AUGUST F. W. PARTZ, OF OAKLAND, CALIFORNIA.

IMPROVEMENT IN THE MANUFACTURE OF SUGAR IN BLOCKS OR CUBES.

Specification forming part of Letters Patent No. 132,921, dated November 12, 1872.

*To all whom it may concern:*

Be it known that I, AUGUST F. W. PARTZ, of Oakland, in the county of Alameda and State of California, have invented certain Improvements in the Manufacture of Cube-Sugar, of which the following is a specification:

The invention herein presented relates to an improved process and apparatus for producing the article of commerce known as cube or block sugar.

My process consists in shaping loose granular sugar by pressure into rectangular bars of suitable length, and after they have become dry and hard removing them from the molds in which they were pressed and dividing them into cubic lumps by means of saws or cutters, so that those lumps have four molded faces, and not more than two that are sawed or cut. The apparatus which I employ for molding the sugar into bars is constructed on the same general plan as one described in a patent recently granted to me for molding sugar into cubes by the use of zigzag-shaped strips of metal which are strung upon a frame and can be so arranged upon a tray as to form a series of square compartments, the difference mainly consisting in the employment, instead of zigzag strips, of straight strips of metal or other suitable material, which are held the requisite distances apart by cross-pieces, so that when they are pushed together upon the frame as far as the cross-pieces permit, and the whole is placed upon a tray, a series of long rectangular compartments is formed, into which moist granular sugar is pressed. The object of my present invention is to provide means for the manufacture of cubes out of granular sugar, which will be available where the employment of my apparatus for the molding of granular sugar directly into cubes, above referred to, would be rendered difficult or impracticable by a lack of the proper material or skilled labor requisite for its construction.

In the following full and exact description of my invention reference is had to the accompanying drawing, of which Figure 1 is an isometrical view of the apparatus which I employ, as ready for use; and Figs. 2 and 3 are separate like views of its component parts, showing more clearly their construction and mode of adjustment.

$c\ c$ are metallic rods, two ends of which are fastened to a stout strip of metal, $s$, while the other two ends are secured by clamps $e\ e$ to a wooden slat, $o$, so that the whole forms a rectangular frame, to which the slat $o$ is to serve as a handle. In the middle of the strip $s$, upon its outer side, is a triangular projection, $x$. Before completing the frame a row of straight strips of metal or other suitable material, such as vulcanized India rubber, $a\ a$, being provided with holes near their ends, and having alternately in their middle, and close to those holes or at other points, cross-pieces of the same material $v\ v$ attached to them, is strung upon the rods $c$. The length of the cross-pieces $v$ on either side of the strips $a$ is about equal to the height of the latter. $m$ is a board of hard wood or a metallic plate, upon two opposite sides of which are a bar, $n$, and two studs, $u\ u$, and upon its two other sides are notched rims, $i\ i$. When the apparatus is to be used, the frame shown in Fig. 2 is taken hold of by the handle $o$, and being lowered at the opposite end so that the strips $a$ slide together against the strip $s$, is placed upon the tray shown in Fig. 3 by shoving the projection $x$ between the studs $u$ and letting the handle $o$ down so that the bar $n$ slips in between it and the strips $a$, the rods $c$ being made of requisite length for that purpose, and the ends of the strips $a$ slip into the notches of the rims $i$. The mold thus put together, as shown in Fig. 1, is charged with moist granular sugar, a layer of which should cover the strips equal in thickness to about one-half of their height. To effect this, the mold may be passed under a scraper fixed in a corresponding horizontal position. It is then brought under a press, or passed upon tracks under a roller, whereby the sugar is compacted to about two-thirds of its former bulk, filling the compartments between the strips $a$ (and $s$) and the cross-pieces $v$. After this the mold is turned upon the edge below the studs $u$ into a nearly vertical position, when the frame with the sugar is taken off the tray and suspended on a drying-rack. Another frame is now placed upon the tray, and the operation proceeds the same as before. In a properly heated and ventilated room the pressed sugar hardens in about two hours, so that it can be removed from the frames. By holding them horizontally and shifting the strips $a$ asunder the bars of sugar are easily separated. These are then ready for being cut up into cubes or similar pieces. For this purpose I place them lengthwise together upon a table and push them against a row of rotating saws fixed at proper intervals upon one shaft; but they may be divided also by cutters or other suitable means. The notched rims $i$ are made to occupy the spaces beneath the rods $c$ and prevent their becoming surrounded by sugar, which it would be inconvenient to remove after it had hardened. Instead of the cross-pieces $v$, tubes of corresponding length, slipped upon the rods $c$, between the strips $a$, may be employed for holding the latter the required distances apart. The same purpose may also be accomplished by making the strips about twice as wide as they would otherwise be made and stringing between them, upon the rods $c$, square bars of wood as long as the strips and about half as thick as the strips are wide, (they being provided, like the strips, with holes near their ends,) so that when both are pushed together they represent on one side an even surface and on the other side a row of parallel grooves or compartments, into which the sugar is to be pressed. This mode of construction admits of the strips being made of thinner material than would otherwise be practicable, as they are held straight between the wooden bars; but the sugar having only one side of it exposed to the air will dry more slowly than in the other cases, where two sides of it are exposed. Loose granular sugar has heretofore been pressed into slabs, and, after drying, they have been broken up into what is termed "crushed sugar." Slabs or plates of pressed granular sugar have also been cut up into cubic lumps; but this has been done while the sugar was still moist and soft, in which condition it is apt to adhere to the knives or cutters and to crumble, besides being pressed laterally more or less out of shape, so that but a very imperfectly-fashioned product could be obtained on this plan. If slabs or plates of pressed sugar were first dried, then sawed into narrow bars, and these were cut crosswise into cubes, most of the latter would have four either somewhat chalky-looking or uneven faces, and only two that were molded, and, therefore, both smooth and of a crystalline luster.

I claim as my invention—

1. The process of transforming loose granular sugar into solid cubic lumps by first pressing it into bars, and, after these have become dry and hard, sawing or cutting them crosswise into cubes or blocks, substantially as herein described.

2. The straight adjustable strips or partitions $a$, held apart by the cross-pieces $v$ or their equivalents, in combination with the frame $c$ $s$ $o$, substantially as and for the purpose herein specified.

AUGUST F. W. PARTZ.

Witnesses:
W. B. EWER,
C. M. RICHARDSON.